(12) United States Patent
Zheng

(10) Patent No.: US 12,335,072 B1
(45) Date of Patent: Jun. 17, 2025

(54) SIGNAL RECEIVING APPARATUS AND METHOD HAVING PARAMETER OPTIMIZATION MECHANISM

(71) Applicant: REALTEK SEMICONDUCTOR CORPORATION, Hsinchu (TW)

(72) Inventor: Xiao-Guo Zheng, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 64 days.

(21) Appl. No.: 18/544,483

(22) Filed: Dec. 19, 2023

(30) Foreign Application Priority Data

Jan. 30, 2023 (CN) .......................... 202310083033.6

(51) Int. Cl.
*H04L 25/03* (2006.01)
*H04L 7/00* (2006.01)

(52) U.S. Cl.
CPC ...... *H04L 25/03057* (2013.01); *H04L 7/0016* (2013.01); *H04L 25/03878* (2013.01)

(58) Field of Classification Search
CPC ............. H04L 25/03057; H04L 7/0016; H04L 25/03878
See application file for complete search history.

(56) References Cited

U.S. PATENT DOCUMENTS

| | | | | |
|---|---|---|---|---|
| 10,809,297 | B2 * | 10/2020 | Lee | G01R 31/31703 |
| 12,120,210 | B2 * | 10/2024 | Alnabulsi | H04L 7/0062 |
| 2010/0284686 | A1 * | 11/2010 | Zhong | H04L 25/03019 398/208 |
| 2024/0235804 | A9 * | 7/2024 | Manian | H03L 7/091 |

* cited by examiner

*Primary Examiner* — Dac V Ha
(74) *Attorney, Agent, or Firm* — WPAT, PC

(57) ABSTRACT

The present disclosure discloses a signal receiving apparatus having parameter optimization mechanism. A signal processing circuit processes a data signal according to at least one equalization parameter to generate an equalized data signal. A clock data recovery circuit performs clock data recovery on the equalized data signal according to a primary sampling signal and a primary threshold value to generate primary recovered data. A multi-sampling circuit performs clock data recovery on the equalized data signal according to secondary sampling signals and secondary threshold values to generate a plurality of pieces of secondary recovered data. A parameter optimization circuit performs comparison and statistics on the primary recovered data and the secondary recovered data to generate an analysis result to control the signal processing circuit to adjust the equalization parameter according to the analysis result and a predetermined optimized parameter requirement such that the analysis result approximates the predetermined optimized parameter requirement.

18 Claims, 5 Drawing Sheets

SIGNAL RECEIVING APPARATUS AND METHOD HAVING PARAMETER OPTIMIZATION MECHANISM

BACKGROUND OF THE INVENTION

1. Field of the Invention

The present disclosure relates to a signal receiving apparatus and a signal receiving method having parameter optimization mechanism.

2. Description of Related Art

Along with the increasing of the resolution and color depth of the display panels, display interfaces require a larger bandwidth to transmit data. Take DisplayPort (DP), which is a mainstream transmission interface, as an example, has progressed from the previous generations having the low bit rate of 1.62 GHz and the high bit rate of 2.7 GHz to the current generation having the ultra-high bit rate of 20 GHz.

Due to the higher speed of data transmission, the data receiving accuracy is needed to be higher at the receiving terminal. If no efficient signal evaluation mechanism is provided at the receiving terminal to optimize the equalization parameter, the signal receiving quality at the receiving terminal degrades.

SUMMARY OF THE INVENTION

In consideration of the problem of the prior art, an object of the present disclosure is to provide a signal receiving apparatus and a signal receiving method having parameter optimization mechanism.

The present invention discloses a signal receiving apparatus having parameter optimization mechanism that includes a signal processing circuit, a clock data recovery circuit, a multi-sampling circuit and a parameter optimization circuit. The signal processing circuit is configured to perform equalization on a data signal according to at least one equalization parameter to generate an equalized data signal. The clock data recovery circuit is configured to perform first clock data recovery on the equalized data signal according to a primary sampling signal and a primary threshold value to generate primary recovered data, wherein the primary sampling signal has a primary sampling phase and the primary threshold value is used to determine a logic level of the equalized data signal. The multi-sampling circuit is configured to perform second clock data recovery on the equalized data signal according to a plurality of secondary sampling signals and a plurality of secondary threshold values to generate a plurality of pieces of secondary recovered data, wherein each of the plurality of secondary sampling signals has a secondary sampling phase and each of the plurality of secondary threshold values is used to determine the logic level of the equalized data signal. The parameter optimization circuit is configured to perform comparison and statistics on the primary recovered data and the plurality pieces of secondary recovered data to generate an analysis result that at least includes an eye diagram of the equalized data signal and a bit error rate, so as to control the signal processing circuit to adjust the at least one equalization parameter according to the analysis result and a predetermined optimized parameter requirement such that the analysis result approximates the predetermined optimized parameter requirement.

The present invention also discloses a signal receiving method having parameter optimization mechanism used in a signal receiving apparatus that includes steps outlined below. Equalization is performed on a data signal according to at least one equalization parameter to generate an equalized data signal by a signal processing circuit. First clock data recovery is performed on the equalized data signal according to a primary sampling signal and a primary threshold value to generate primary recovered data by a clock data recovery circuit, wherein the primary sampling signal has a primary sampling phase and the primary threshold value is used to determine a logic level of the equalized data signal. Second clock data recovery is performed on the equalized data signal according to a plurality of secondary sampling signals and a plurality of secondary threshold values to generate a plurality of pieces of secondary recovered data by a multi-sampling circuit, wherein each of the plurality of secondary sampling signals has a secondary sampling phase and each of the plurality of secondary threshold values is used to determine the logic level of the equalized data signal. Comparison and statistics are performed on the primary recovered data and the plurality pieces of secondary recovered data to generate an analysis result that at least includes an eye diagram of the equalized data signal and a bit error rate by a parameter optimization circuit, so as to control the signal processing circuit to adjust the at least one equalization parameter according to the analysis result and a predetermined optimized parameter requirement such that the analysis result approximates the predetermined optimized parameter requirement.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a signal receiving apparatus and a signal receiving method having parameter optimization mechanism to sample the data signal according to a plurality of phases and multiple threshold values to generate sampling results so as to perform comparison and statistics accordingly. The analysis result of the data signal can be obtained to adjust the equalization parameter accordingly to make the analysis result of the data signal approximate the optimized parameter requirements.

Figure 1:
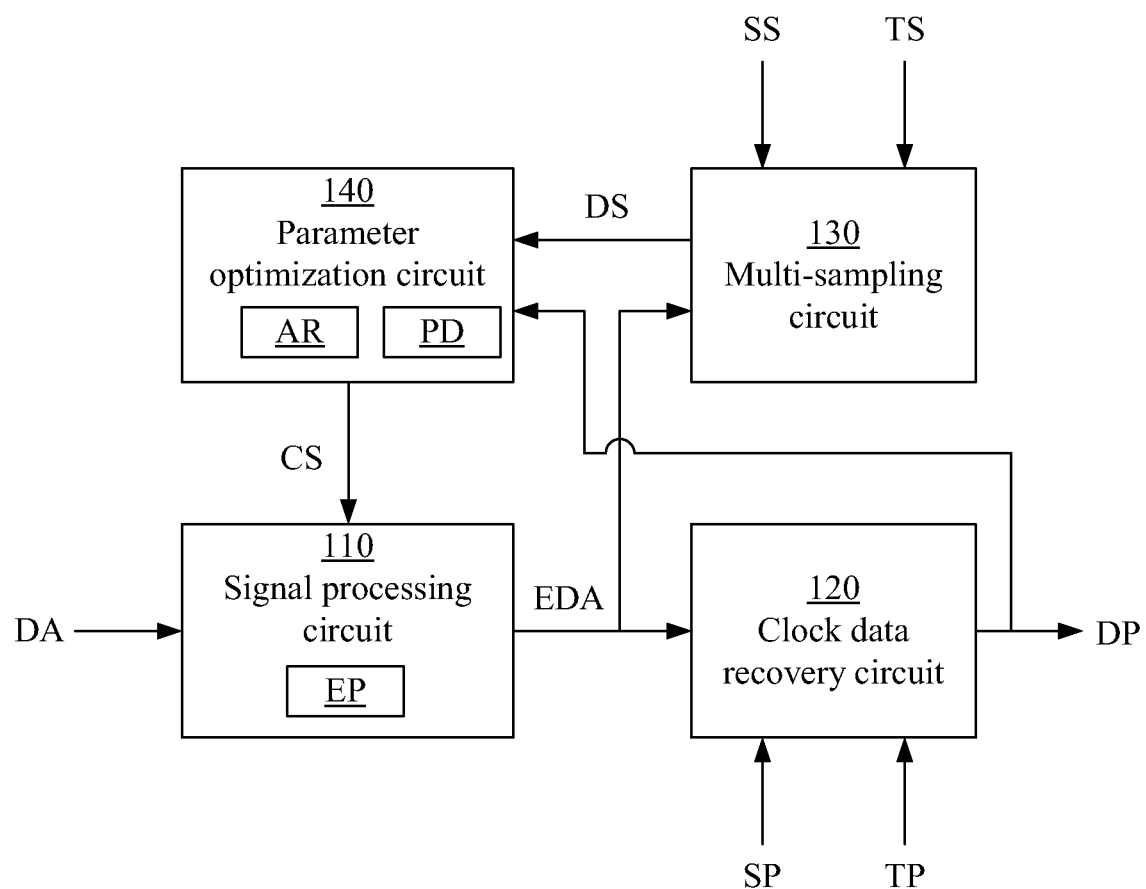
FIG. 1 illustrates a block diagram signal receiving apparatus having parameter optimization mechanism according to an embodiment of the present invention.

Reference is now made to FIG. 1. FIG. 1 illustrates a block diagram of a signal receiving apparatus 100 having parameter optimization mechanism according to an embodiment of the present invention.

In an embodiment, the signal receiving apparatus 100 is a display apparatus to receive data signal DA from such as, but not limited to a computer or other signal source apparatuses (not illustrated) that is able to provide image data through DisplayPort (DP) interface to process and playback the data signal DA. However, the present invention is not limited thereto.

The signal receiving apparatus 100 includes a signal processing circuit 110, a clock data recovery circuit 120, a multi-sampling circuit 130 and a parameter optimization circuit 140.

Figure 2:
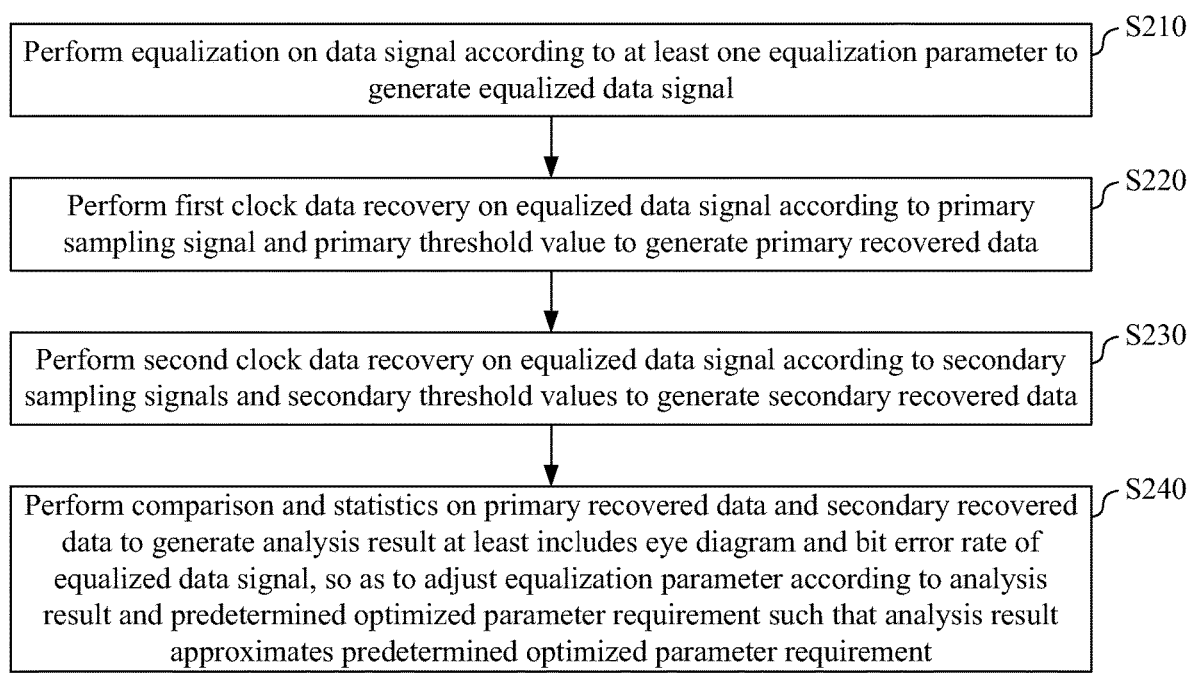
FIG. 2 illustrates a flow chart of a signal receiving method having parameter optimization mechanism according to an embodiment of the present invention.

Reference is now made to FIG. 2 at the same time. FIG. 2 illustrates a flow chart of a signal receiving method 200 having parameter optimization mechanism according to an embodiment of the present invention.

The signal receiving method 200 can be used in the signal receiving apparatus 100 in FIG. 1. The configuration and operation of the signal receiving apparatus 100 are described in detail in the following paragraphs in accompany with FIG. 1 and FIG. 2.

In step S210, the signal processing circuit 110 is configured to perform equalization on the data signal DA according to at least one equalization parameter EP to generate an equalized data signal EDA.

Figure 3:
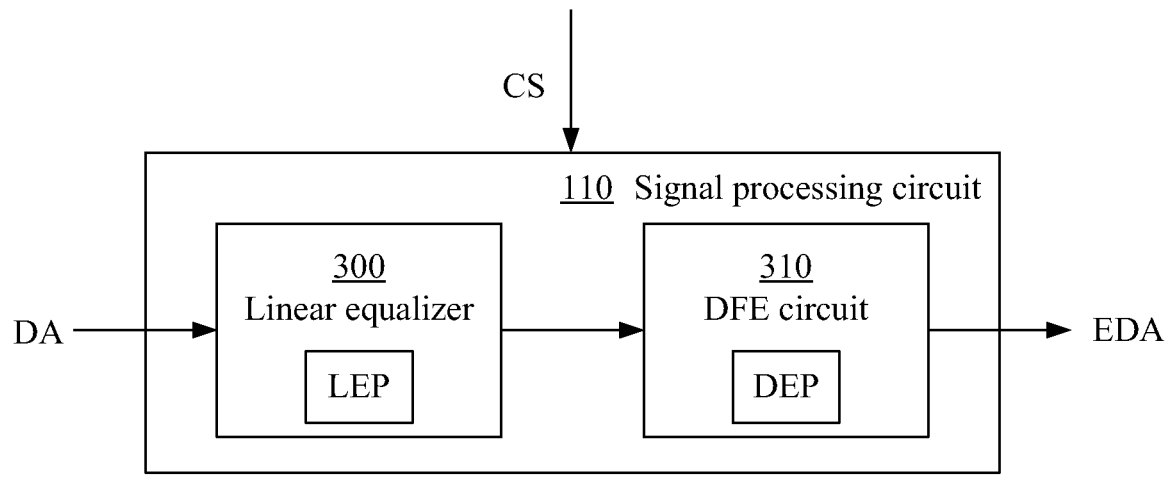
FIG. 3 illustrates a more detailed block diagram of the signal processing circuit according to an embodiment of the present invention.

Reference is now made to FIG. 3. FIG. 3 illustrates a more detailed block diagram of the signal processing circuit 110 according to an embodiment of the present invention. In an embodiment, the signal processing circuit 110 includes a linear equalizer 300 and a decision feedback equalizer (DFE) circuit 310.

The linear equalizer 300 is used to compensate the loss of the data signal DA in the transmission wire and mainly compensate the slope of the transition edge of the data signal DA. Corresponding to the linear equalizer 300, the equalization parameter EP may include at least one linear equalization parameter LEP.

The decision feedback equalizer circuit 310 is a digital equalizer and is also used to compensate the loss of the data signal DA in the transmission wire, where the decision feedback equalizer circuit 310 mainly compensates the amplitude of the data signal DA. Corresponding to the decision feedback equalizer circuit 310, the equalization parameter EP may include at least one decision feedback equalization parameter DEP.

It is appreciated that the circuits that the signal processing circuit 110 includes are merely an example. In other embodiments, the signal processing circuit 110 may selectively include other circuits or include a combination of other circuits and the two circuits described above to perform equalization on the data signal DA according to the corresponding equalization parameters.

In step S220, the clock data recovery circuit 120 is configured to perform first clock data recovery on the equalized data signal EDA according to a primary sampling signal SP and a primary threshold value TP to generate primary recovered data DP, wherein the primary sampling signal SP has a primary sampling phase and the primary threshold value TP is used to determine a logic level of the equalized data signal EDA.

The primary sampling signal SP and the equalized data signal EDA have the same frequency, where the primary sampling signal SP has a primary sampling phase that corresponds to a time spot of the signal time period of the equalized data signal EDA. The clock data recovery circuit 120 samples the equalized data signal EDA at a time spot in the signal time period of the equalized data signal EDA according to the primary sampling phase. In an embodiment, the primary sampling phase corresponds to a time spot, e.g., the centermost time spot, in the signal time period of the equalized data signal EDA in order to increase the accuracy of the sampling.

The primary threshold value TP is used by the clock data recovery circuit 120 to determine the logic level of the equalized data signal EDA. In an embodiment, the primary threshold value TP corresponds to a value, e.g., the centermost value, between an ideal high level and an ideal low level of the equalized data signal EDA.

For example, when the equalized data signal EDA is transmitted by using a non-returned zero code of a differential signal form, a positive terminal voltage and a negative terminal voltage symmetry to each other are used to perform transmission. The logic level is determined according to a comparison between a subtraction result of the positive terminal voltage and the negative terminal voltage and the primary threshold value TP.

In a numerical example, one of the positive terminal voltage and the negative terminal voltage is 50 millivolts (mV) and the other one of the positive terminal voltage and the negative terminal voltage is −50 millivolts under an ideal condition. If the subtraction result is +100 millivolts (where the positive terminal voltage is +50 millivolts and the negative terminal voltage is −50 millivolts), the corresponding equalized data signal EDA is determined to be at a high state logic level (1). If the subtraction result is −100 millivolts (where the positive terminal voltage is −50 millivolts and the negative terminal voltage is +50 millivolts), the corresponding equalized data signal EDA is determined to be at a low state logic level (0). Under such a condition, the primary threshold value TP is set to be 0 volt.

It is appreciated that the non-returned zero code having the differential signal form described above is merely an example. In other embodiments, the equalized data signal EDA may be transmitted by using other forms. The present invention is not limited thereto.

In step S230, the multi-sampling circuit 130 is configured to perform second clock data recovery on the equalized data signal EDA according to a plurality of secondary sampling signals SS and a plurality of secondary threshold values TS to generate a plurality of secondary recovered data DS, wherein each of the secondary sampling signals SS has a secondary sampling phase and each of the secondary threshold values TS is used to determine a logic level of the equalized data signal EDA.

In an embodiment, an amount of the secondary sampling signals SS is N, an amount of the secondary threshold values TS is M and an amount of the secondary recovered data DS is P, and each of N, M and P is a positive integer.

Each of the secondary sampling signals SS and the equalized data signal EDA have the same frequency, where each of the secondary sampling signals SS has a secondary sampling phase. The secondary sampling phases of these secondary sampling signals SS correspond to a plurality of time spots in the signal time period of the equalized data signal EDA. As a result, the multi-sampling circuit 130 samples the equalized data signal EDA at the time spots in the signal time period of the equalized data signal EDA according to the secondary sampling signals SS. In an embodiment, these secondary sampling phases can be generated by using a phase interpolator circuit.

In an embodiment, the time spots that the secondary sampling phases correspond to are evenly distributed in the signal time period of the equalized data signal EDA, and each two of the neighboring secondary sampling phases have the same phase difference. For example, when the signal time period of the equalized data signal EDA is represented as $2\pi$, an amount of the secondary sampling phases can be 8, in which each two of the neighboring secondary sampling phases have a phase difference of $\pi/4$.

Each of the secondary threshold values is used to determine the logic level of the equalized data signal EDA. In an embodiment, the secondary threshold values may include such as, but not limited to +50 millivolts, −50 millivolts, +60 millivolts, −60 millivolts, +70 millivolts, −70 millivolts, +80 millivolts, −80 millivolts, +90 millivolts and −90 millivolts. The multi-sampling circuit 130 determines the logic levels of the equalized data signal EDA respectively according to these secondary threshold values.

According to different phases and different threshold values, the multi-sampling circuit 130 is configured to generate different secondary recovered data DS. It is appreciated that, the multi-sampling circuit 130 may perform sampling independently accordingly to all the different phases and all the different threshold values or perform the sampling based on certain combinations of the phases and the threshold values, such that the amount P of the secondary recovered data DS is larger than the total amount M+N of the secondary sampling signals SS and the secondary threshold values TS. The present invention is not limited thereto.

It is appreciated that, in an embodiment, each of the clock data recovery circuit 120 and the multi-sampling circuit 130 includes such as, but not limited to a phase-lock loop circuit, a phase-interpolation circuit, a sampling circuit, a phase detection circuit, a filtering circuit or a combination thereof (not illustrated) to perform clock data recovery according to the equalized data signal EDA. In FIG. 1, though the clock data recovery circuit 120 and the multi-sampling circuit 130 are illustrated as two independent circuit elements, the clock data recovery circuit 120 and the multi-sampling circuit 130 may be integrated together to share a plurality of circuit elements in practical implementation and only perform the sampling according to different sampling signals and threshold values by using different circuits. The present invention is not limited thereto.

Further, in FIG. 1, the primary sampling signal SP, the primary threshold value TP, the secondary sampling signals SS and the secondary threshold values TS are illustrated as to be fed from external circuits. However, in practical implementation, these sampling signals and threshold voltages may be provided by internal circuits of the clock data recovery circuit 120 and the multi-sampling circuit 130.

In step S240, the parameter optimization circuit 140 is configured to perform comparison and statistics on the primary recovered data DP and the secondary recovered data DS to generate an analysis result AR that at least includes an eye diagram and a bit error rate of the equalized data signal EDA, so as to control the signal processing circuit 110 to adjust the equalization parameter EP according to the analysis result AR and a predetermined optimized parameter requirement PD, such that the analysis result AR approximates the predetermined optimized parameter requirement PD. In an embodiment, the parameter optimization circuit 140 may control the signal processing circuit 110 by using such as, but not limited to a control signal CS to adjust the equalization parameter EP.

Figure 4:
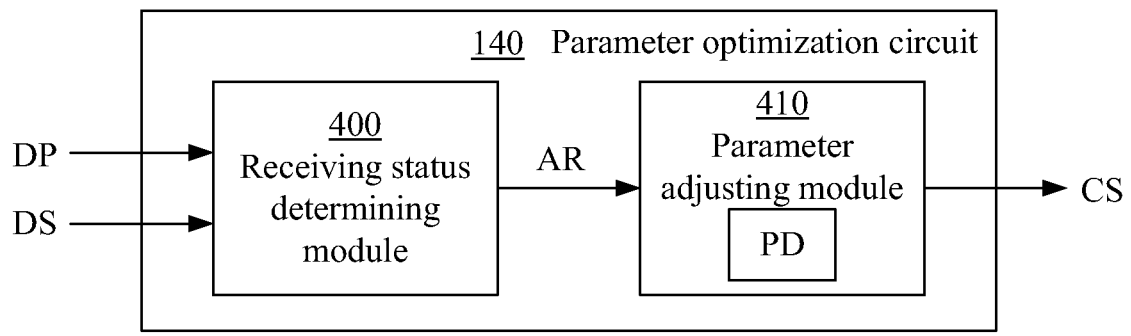
FIG. 4 illustrates a more detailed block diagram of the parameter optimization circuit according to an embodiment of the present invention.

Reference is now made to FIG. 4. FIG. 4 illustrates a more detailed block diagram of the parameter optimization circuit 140 according to an embodiment of the present invention.

In an embodiment, the parameter optimization circuit 140 includes a receiving status determining module 400 and a parameter adjusting module 410. In an embodiment, the parameter optimization circuit 140 can be implemented by a processing chip and is configured to execute software to operate as the receiving status determining module 400 and the parameter adjusting module 410. In another embodiment, the parameter optimization circuit 140 can be fully implemented by hardware that includes the circuits that serve as the receiving status determining module 400 and the parameter adjusting module 410. The present invention is not limited thereto.

The receiving status determining module 400 is used to generate the analysis result AR. More specifically, the receiving status determining module 400 is configured to perform comparison on the primary recovered data DP and the secondary recovered data DS to perform statistics of unmatched times on each of the secondary recovered data DS.

Corresponding to each of the secondary recovered data DS, in each of the comparison performed, the receiving status determining module 400 documents the comparison result as 0 when the secondary recovered data DS matches the primary recovered data DP and documents the comparison result as 1 when the secondary recovered data DS does not match the primary recovered data DP. The receiving status determining module 400 performs statistics by accumulating the comparison results to obtain the unmatched times. It is appreciated that the statistics method described above is merely an example. In other embodiments, the receiving status determining module 400 may use other statistic methods. The present invention is not limited thereto.

The receiving status determining module 400 determines an eye width of the eye diagram of the equalized data signal EDA according to the unmatched times related to the secondary sampling phase of the secondary sampling signals DS.

In a numerical example, the secondary recovered data DS is generated according to the secondary sampling signals SS having 8 secondary sampling phases, and 100 comparisons are made between the secondary recovered data DS and the primary recovered data DP. The receiving status determining module 400 performs the statistics accordingly and generates 8 amounts of unmatched times including 100, 90, 30, 0, 0, 0, 100 and 100. The amounts of unmatched times show that for the 8 secondary sampling phases, the sampling results (i.e., secondary recovered data DS) generated by 3 of the secondary sampling phases are the same as the sampling result (i.e., the primary recovered data DP) generated by the primary sampling phase.

As a result, the receiving status determining module 400 determines that the eye diagram has the eye width with $3/8$ unit according to such a statistic result, in which 1 unit corresponds to one signal time period of the equalized data signal EDA.

It is appreciated that, the values described above are merely an example. In practical implementation, in order to increase the accuracy, the secondary sampling signals SS may have a larger amount of phases such as 32, 64 or even higher amount to perform the sampling in one signal time period of the equalized data signal EDA. Further, thousands of times of comparisons can be made between the secondary recovered data DS and the primary recovered data DP.

Under the condition that the amount of phases and the amount of comparisons are both increased, the receiving status determining module 400 may perform more accurate determination on the eye width of the eye diagram.

The receiving status determining module 400 may determine a statistic result of a position of a transition edge of the equalized data signal EDA according to the statistics performed on the amounts of the unmatched times. For example, the amount of the unmatched times of one of the secondary sampling phases is 90. The occurrence of unmatched condition means that the sampling result of such a secondary sampling phase is opposite to the sampling result of the primary sampling phase such that the receiving status determining module 400 determines that the occurrence of the transition edge is behind such a secondary sampling phase for 90 times. The receiving status determining module 400 further determines the information (including the position and the amount of occurrence) of the transition edge and further generates analysis of a jitter distribution of the transition edge.

When the jitter distribution is a normal distribution, the receiving status determining module 400 determines a total jitter amount of the transition edge according to the unmatched times of all the secondary sampling phases to further determine the bit error rate according to a relation between the total jitter amount and a jitter threshold value. For example, the receiving status determining module 400 may determine that the bit error rate satisfies the requirement when the total jitter amount is smaller than the threshold value of $1/8$ unit. For the example that the statistics of the unmatched times are performed corresponding to 8 secondary sampling phases, the transition edge appears in 5 of the secondary sampling phases. The receiving status determining module 400 determines that the total jitter amount is $5/8$ unit accordingly and further determines that the bit error rate of the equalized data signal EDA does not satisfy the requirement.

In some approaches, when the transmission speed is 10 GHz, 109 bits of data amount is needed to evaluate the bit error rate of 10-9. Such data amount takes 100 microseconds to process. In the present application, the evaluation methods that uses multi-phase sampling only needs dozens or hundreds of microseconds even if the amount of comparisons performed on the secondary sampling phase and the primary sampling phase are several thousand times. When the accuracy of the bit error rate is needed to be higher, the time cost of the evaluation methods that uses the multi-phase sampling can be even lower than the approaches described above.

Besides the eye width of the eye diagram, the receiving status determining module 400 also determines an eye height of the eye diagram of the equalized data signal EDA according to the unmatched times related to the secondary threshold values.

In an embodiment, when a secondary threshold value is a positive value, the receiving status determining module 400 only performs comparison according to the primary recovered data DP determined to be at the high state logic level. Further, when the secondary threshold value is a negative value, the receiving status determining module 400 only performs the comparison according to the primary recovered data DP determined to be at the low state logic level.

Take the secondary threshold value having the positive value as an example, the condition that the amount of the unmatched times is always 0 means that the signal level of the equalized data signal EDA is always higher than such a secondary threshold value. As a result, the receiving status determining module 400 may determine that the eye height of the eye diagram of the equalized data signal EDA exceeds such a secondary threshold value. By performing comparison with different secondary threshold values, the receiving status determining module 400 is able to determine the signal level of the equalized data signal EDA, i.e., the size of the eye height of the eye diagram. The receiving status determining module 400 can perform the same determination according to the secondary threshold values having the negative values. The detail is not described herein.

By perform sampling and analyzing according to a plurality of secondary sampling phases and a plurality of secondary threshold values, the receiving status determining module 400 can determine the eye height and the eye width of the whole eye diagram to further determine the shape and the area of the eye diagram according to the eye width and the eye height.

The parameter adjusting module 410 is configured to control the signal processing circuit 110 to adjust the equalization parameter EP by using such as but not limited to the control signal CS according to the analysis result AR and the predetermined optimized parameter requirement PD. After multiple times of adjustment, the parameter adjusting module 410 can make the analysis result AR approximate the predetermined optimized parameter requirement PD.

In an embodiment, when the parameter adjusting module 410, according to the predetermined optimized parameter requirement PD, determines that the slope of the transition edge of the equalized data signal EDA is needed to be adjusted, the linear equalization parameter LEP of the linear equalizer 300 can be adjusted first. When the parameter adjusting module 410, according to the predetermined optimized parameter requirement PD, determines that the signal level of the equalized data signal EDA is needed to be adjusted, the decision feedback equalization parameter DEP of the decision feedback equalizer circuit 310 can be adjusted first. However, the present invention is not limited thereto.

In different applications, the predetermined optimized parameter requirement PD can be configured differently. For example, the predetermined optimized parameter requirement PD can be configured to keep the eye width as large as possible. Under such a condition, the parameter optimization circuit 140 can adjust the eye width of the equalized data signal EDA without taking the eye height and the bit error rate into consideration. In another example, the predetermined optimized parameter requirement PD can be configured to keep the eye height as large as possible under the condition that the bit error rate is not higher than a specific threshold value. Under such a condition, the parameter optimization circuit 140 can adjust the eye height while keeping the total jitter amount (which is used to determine the bit error rate) within a specific unit without taking the eye width into consideration.

In an embodiment, the parameter optimization circuit 140 may perform the analyzing and adjusting according a predetermined operation flow. An operation flow of the parameter optimization circuit 140 in a usage scenario is described in the following paragraphs.

Figure 5:
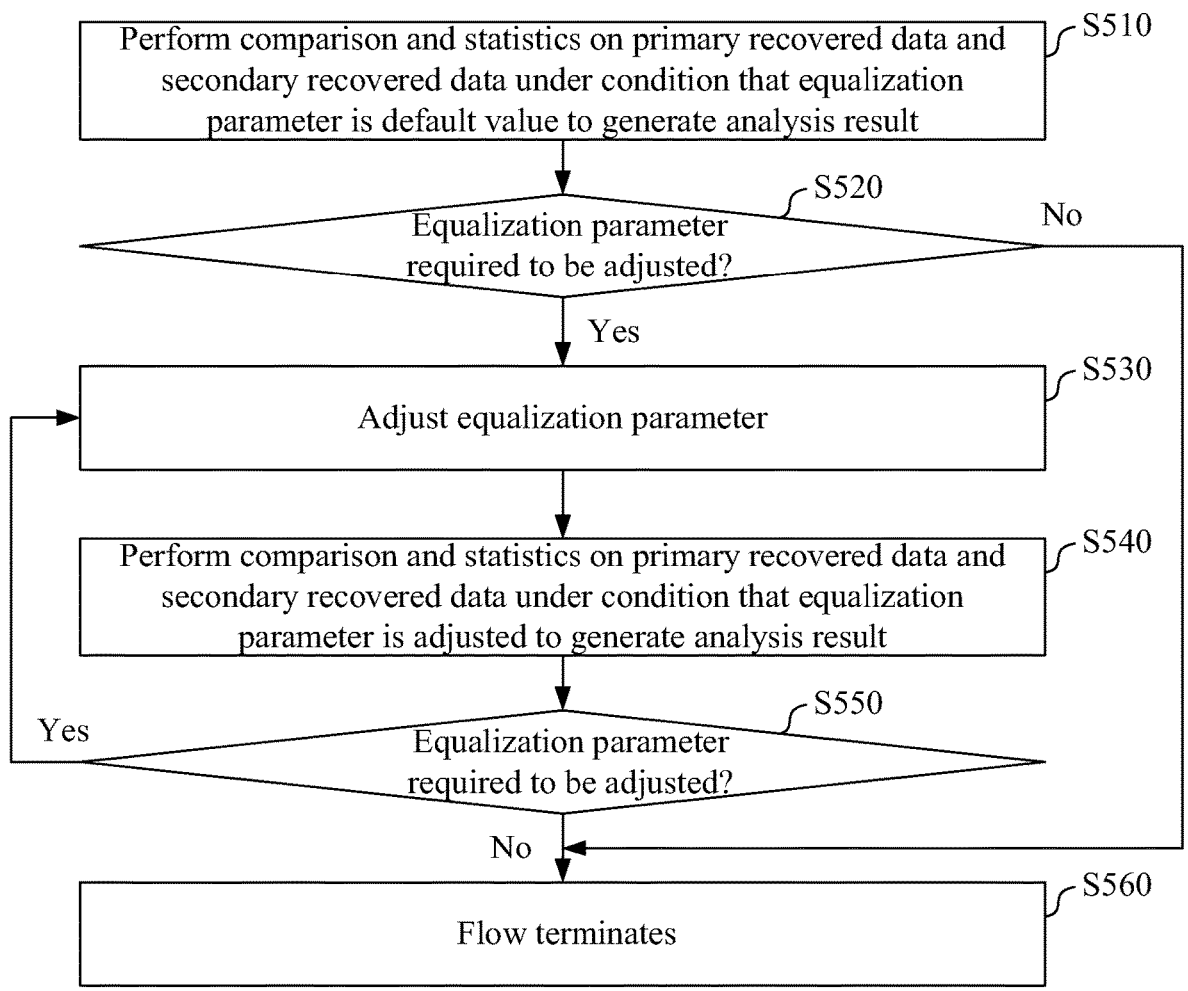
FIG. 5 illustrates a flow chart of an operation flow used in the parameter optimization circuit according to an embodiment of the present invention.

Reference is now made to FIG. 5. FIG. 5 illustrates a flow chart of an operation flow 500 used in the parameter optimization circuit 140 according to an embodiment of the present invention.

In step S510, the receiving status determining module 400 performs comparison and statistics on the primary recovered data DP and the secondary recovered data DS under the condition that the equalization parameter EP of the signal processing circuit 110 is a default value, to generate the analysis result AR.

In step S520, the parameter adjusting module 410 determines whether the equalization parameter EP is needed to be adjusted according to the analysis result AR and the predetermined optimized parameter requirement PD.

In step S530, when the parameter adjusting module 410 determines that the analysis result AR does not satisfy the predetermined optimized parameter requirement PD and the equalization parameter EP is needed to be adjusted, the parameter adjusting module 410 controls the signal processing circuit 110 to adjust the equalization parameter EP.

In step S540, the receiving status determining module 400 performs the comparison and statistics on the primary recovered data DP and the secondary recovered data DS under the condition that the equalization parameter EP is adjusted, to generate the analysis result AR.

In step S550, the parameter adjusting module 410 determines that the equalization parameter EP is needed to be adjusted according to the analysis result AR and the predetermined optimized parameter requirement PD.

When the parameter adjusting module 410 determines that the analysis result AR does not satisfy the predetermined optimized parameter requirement PD and the equalization parameter EP is still needed to be adjusted, the flow goes back to step S530 to keep performing the adjusting.

In step S560, when the parameter adjusting module 410 determines that the analysis result AR satisfies the predetermined optimized parameter requirement PD and the equalization parameter EP is not needed to be adjusted in step S520 and step S550, the flow 500 terminates.

In an embodiment, the parameter adjusting module 410 may determine a parameter adjusting direction of the equalization parameter EP according to the analysis result AR and the predetermined optimized parameter requirement PD by using a more detailed operation flow and determine whether the equalization parameter EP is needed to be kept being adjusted.

Figure 6:
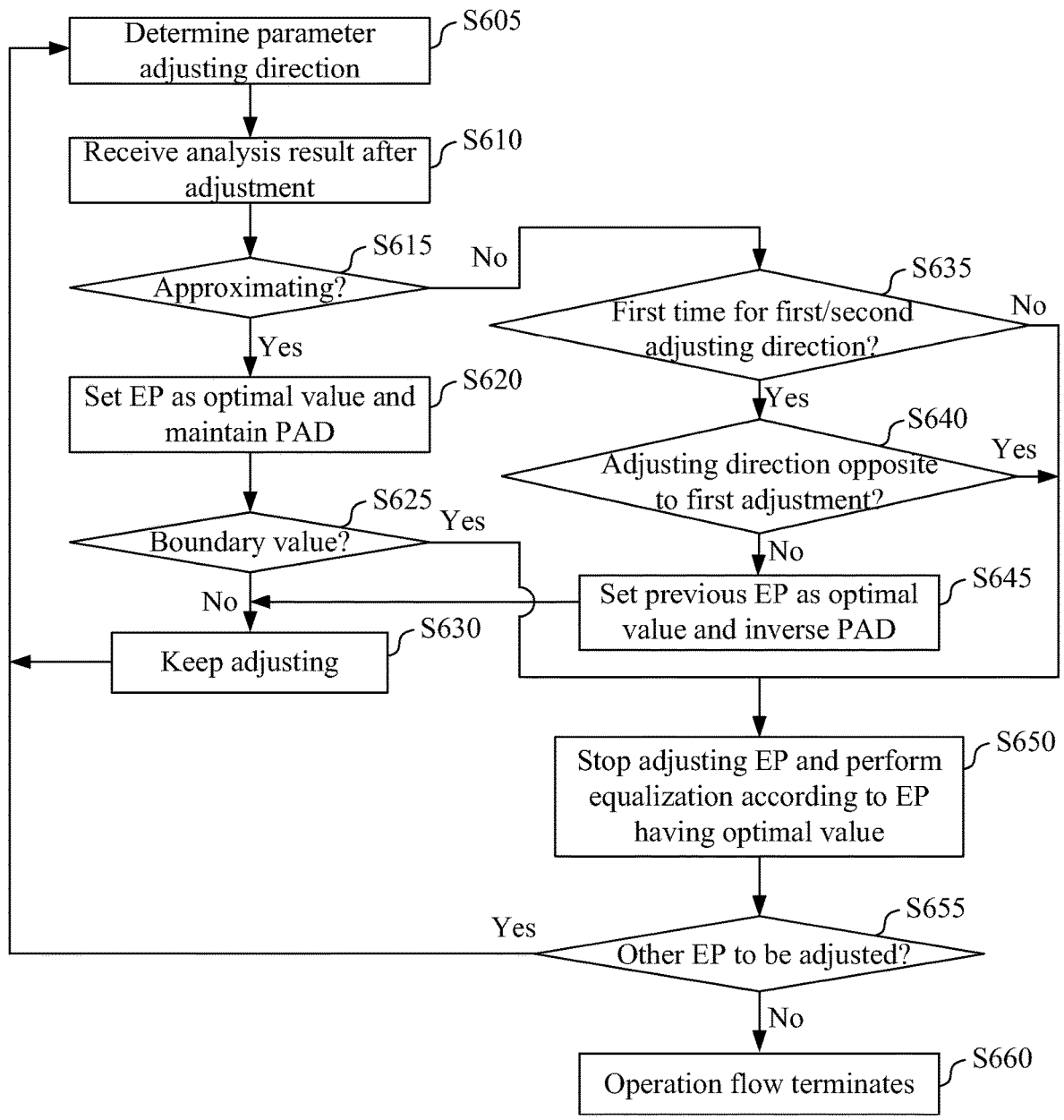
FIG. 6 illustrates a more detailed operation flow used in the parameter adjusting module according to an embodiment of the present invention.

Reference is now made to FIG. 6. FIG. 6 illustrates a more detailed operation flow 600 used in the parameter adjusting module 410 according to an embodiment of the present invention.

In step S605, the parameter adjusting module 410 determines the parameter adjusting direction, wherein the parameter adjusting direction can be a first adjusting direction or a second adjusting direction, and the first adjusting direction and the second adjusting direction respectively increase or decrease the equalization parameter EP.

In step S610, the parameter adjusting module 410 receives the analysis result AR after adjustment according to the selected parameter adjusting direction.

In step S615, the parameter adjusting module 410 determines whether the analysis result AR approximates even closer to the predetermined optimized parameter requirement PD. More specifically, the parameter adjusting module 410 determines whether the analysis result after the N-th adjustment is better than the analysis result after the N−1-th adjustment.

In step S620, when the analysis result AR approximates even closer to the predetermined optimized parameter requirement PD, the parameter adjusting module 410 sets the equalization parameter EP (abbreviated as EP in FIG. 6) as the optimal value and keeps the parameter adjusting direction (abbreviated as PAD in FIG. 6).

More specifically, the parameter adjusting module 410 may set the equalization parameter EP after the N-th adjustment as the optimal value when the analysis result after the N-th adjustment is better than the analysis result after the N−1-th adjustment and keeps the parameter adjusting direction to perform the N+1-th adjustment.

In step S625, the parameter adjusting module 410 determines whether the equalization parameter EP after the N-th adjustment reaches the boundary value. The boundary value can be a maximum value or a minimum value of such a equalization parameter.

In step S630, when the equalization parameter EP does not reach the boundary value, the parameter adjusting module 410 determines that the equalization parameter EP is needed to be kept being adjusted. The flow goes back to step S605 to perform the N+1-th adjustment.

In different embodiments, the parameter adjusting module 410 determines whether the equalization parameter EP is needed to be kept being adjusted according to different settings. For example, when the parameter adjusting module 410 determines that the current analysis result AR is still far from the predetermined optimized parameter requirement PD, the parameter adjusting module 410 determines that the equalization parameter EP is needed to be kept being adjusted. In another example, the parameter adjusting module 410 may determine whether the equalization parameter EP is needed to be kept being adjusted according to the amount of adjustments that are performed. When the amount of adjustments does not reach an upper limit, the parameter adjusting module 410 determines that the equalization parameter EP is needed to be kept being adjusted.

In step S635, when the parameter adjusting module 410 determines that the analysis result AR does not approximate closer to the predetermined optimized parameter requirement PD in step S615, i.e., the analysis result after the N-th adjustment is worse than the analysis result after the N−1-th adjustment, the parameter adjusting module 410 determines whether the N-th adjustment is the first time to perform the adjustment with the first adjusting direction or is the first time to perform the adjustment with the second adjusting direction.

In step S640, when the parameter adjusting module 410 determines that the N-th adjustment is the first time to perform the adjustment with the first adjusting direction or is the first time to perform the adjustment with the second adjusting direction, the parameter adjusting module 410 determines whether the adjusting direction of the N-th adjustment is the opposite of the adjusting direction of the 1st adjustment.

In step S645, when the parameter adjusting module 410 determines that the adjusting direction of the N-th adjustment is not the opposite of the adjusting direction of the 1st adjustment in step S640, the parameter adjusting module 410 sets the previous one of the equalization parameter EP as the optimal value and reverses the parameter adjusting direction. The flow goes to step S630 such that the parameter adjusting module 410 determines that the equalization parameter EP is needed to be kept being adjusted. The flow further goes to step S605 to perform the N+1-th adjustment.

More specifically, under such a condition, the parameter adjusting module 410 sets the equalization parameter EP after the N−1-th adjustment as the optimal value and reverses the parameter adjusting direction to perform the N+1-th adjustment, when the analysis result after the N-th adjustment is worse than the analysis result after the N−1-th adjustment.

In step S650, when the parameter adjusting module 410 determines that the equalization parameter EP after the N-th adjustment reaches the boundary value in step S625, when the parameter adjusting module 410 determines that the N-th adjustment is not the first time to perform the adjustment either with the first adjusting direction or the second adjusting direction in step S635, or when the parameter adjusting module 410 determines that the adjusting direction of the N-th adjustment is the opposite of the adjusting direction of the 1st adjustment in step S640, the parameter adjusting module 410 stops adjusting the equalization parameter EP and controls the signal processing circuit 110 to perform the equalization according to the equalization parameter EP with the optimal value.

In an embodiment, when the parameter adjusting module 410 determines that the equalization parameter EP after the N-th adjustment reaches the boundary value in step S625, the equalization parameter EP is not able to be kept being adjusted. As a result, the parameter adjusting module 410 controls the signal processing circuit 110 to operate according to the equalization parameter EP with the optimal value.

In an embodiment, when the parameter adjusting module 410 determines that the N-th adjustment is not the first time to perform adjustment either with the first adjusting direction or the second adjusting direction in step S635, it means that the analysis result after the N−1-th adjustment is better than the analysis result AR after the N−2-th adjustment and the analysis result after the N-th adjustment is worse than the analysis result after the N−1-th adjustment. Such a condition implies that the analysis result after the N−1-th adjustment is the optimal result. As a result, the parameter adjusting module 410 controls the signal processing circuit 110 to operate according to the equalization parameter EP with the optimal value.

In an embodiment, when the parameter adjusting module 410 determines that the N-th adjustment is the first time to perform the adjustment with the first adjusting direction or is the first time to perform the adjustment with the second adjusting direction in step S635, and determines that the adjusting direction of the N-th adjustment is the opposite of the adjusting direction of the 1st adjustment in step S640, it means that the adjustment performed currently is the 2nd adjustment. Under such a condition, the analysis result AR after the 1st adjustment is worse than the analysis result AR without any adjustment and the analysis result AR after the 2nd adjustment is worse than the analysis result AR after the 1st adjustment. Such a condition implies that the analysis result AR without any adjustment is already the optimal result. As a result, the parameter adjusting module 410 controls the signal processing circuit 110 to operate according to the equalization parameter EP with the optimal value.

In step S655, the parameter adjusting module 410 determines whether any other equalization parameter EP is needed to be adjusted after step S650. When at least one other equalization parameter EP is needed to be adjusted, the flow goes back to step S605 such that the parameter adjusting module 410 selects the parameter adjusting direction for the equalization parameter EP needed to be adjusted, so as to perform the following steps.

In step S660, when no other equalization parameter EP is needed to be adjusted, the flow 600 terminates.

Two usage scenarios are used as an example to further describe the execution of the operation flow 600.

In the first usage scenario, the parameter adjusting module 410 selects the first adjusting direction to perform the 1st adjustment (N=1) in step S610. When the parameter adjusting module 410 determines that the analysis result AR is better than the analysis result AR after the 0-th adjustment (i.e., no adjustment is performed) in step S615, the parameter adjusting module 410 sets the equalization parameter EP after the 1st adjustment as the optimal value and keeps the parameter adjusting direction to be the first adjusting direction in step S620. When the parameter adjusting module 410 determines that the equalization parameter EP does not reach the boundary value in step S625, the parameter adjusting module 410 determines that the equalization parameter EP is needed to be adjusted in step S630 so as to return to step S605 to perform the 2nd adjustment.

When the parameter adjusting module 410 determines that the analysis result AR after the 2nd adjustment is worse than the analysis result AR after the 1st adjustment in step S615, the parameter adjusting module 410 determines that the current adjustment is not the first time to perform the adjustment either with the first adjusting direction or the second adjusting direction in step S635. The parameter adjusting module 410 further stops adjusting the equalization parameter EP and controls the signal processing circuit 110 to perform the equalization according to the equalization parameter EP with the optimal value in step S650. Subsequently, the parameter adjusting module 410 determines whether another equalization parameter EP is needed to be adjusted or the operation flow 600 is to be terminated according to the determination result generated in step S655.

On the other hand, when the parameter adjusting module 410 determines that the analysis result AR after the 2nd adjustment is better than the analysis result AR after the 1st adjustment in step S615, the parameter adjusting module 410 keeps executing step S620 and the following steps. When the parameter adjusting module 410 performs multiple adjustments with the first adjusting direction by using the steps described above and finally determines that the analysis result AR after the N-th adjustment (N>2) is worse than the analysis result AR after the N−1-th adjustment in step S615, the parameter adjusting module 410 determines that the adjustment is not the first time to perform the adjustment either with the first adjusting direction or the second adjusting direction in step S635. The parameter adjusting module 410 further stops adjusting the equalization parameter EP and controls the signal processing circuit 110 to perform the equalization according to the equalization parameter EP with the optimal value in step S650. Subsequently, the parameter adjusting module 410 determines whether another equalization parameter EP is needed to be adjusted or the operation flow 600 is to be terminated according to the determination result generated in step S655.

In the second usage scenario, the parameter adjusting module 410 selects the first adjusting direction to perform the 1st adjustment (N=1) in step S610. When the parameter adjusting module 410 determines that the analysis result AR is worse than the analysis result AR after the 0-th adjustment (i.e., no adjustment is performed) in step S615, the parameter adjusting module 410 determines that the current adjustment is the first adjustment that is performed with the first adjusting direction, and determines that the adjusting direction of the 1st adjustment is not opposite to the adjusting direction of the 1st adjustment in step S640. The parameter adjusting module 410 sets the previous equalization parameter as the optimal value and reverses the parameter adjusting direction in step S645. The parameter adjusting module 410 returns to step S605 to perform the 2nd adjustment when the equalization parameter EP is determined to be needed to be adjusted in step S630.

When the parameter adjusting module 410 determines that the analysis result AR after the 2nd adjustment is worse than the analysis result AR after the 1st adjustment in step S615, the parameter adjusting module 410 determines that the current adjustment is the first time to perform the adjustment with the second adjusting direction in step S635 and determine that the adjusting direction of the 2nd adjustment is the opposite of the adjusting direction of the 1st adjustment in step S640. The parameter adjusting module 410 further stops adjusting the equalization parameter EP and controls the signal processing circuit 110 to perform the equalization according to the equalization parameter EP with the optimal value in step S650. Subsequently, the parameter adjusting module 410 determines whether another equalization parameter EP is needed to be adjusted or the operation flow 600 is to be terminated according to the determination result generated in step S655.

On the other hand, when the parameter adjusting module 410 determines that the analysis result AR after the 2nd adjustment is better than the analysis result AR after the 1st adjustment in step S615, the parameter adjusting module 410 sets the equalization parameter after the 2nd adjustment as the optimal value and keeps the parameter adjusting direction to be the second adjusting direction in step S620. When the parameter adjusting module 410 determines that the equalization parameter EP does not reach the boundary value in step S625, the parameter adjusting module 410 determines that the equalization parameter EP is needed to be adjusted in step S630 so as to return to step S605 to perform the 3rd adjustment.

When the parameter adjusting module 410 performs multiple adjustments with the second adjusting direction by using the steps described above and finally determines that the analysis result AR after the N-th adjustment (N>2) is worse than the analysis result AR after the N−1-th adjustment in step S615, the parameter adjusting module 410 determines that the adjustment is not the first time to perform the adjustment either with the first adjusting direction or the second adjusting direction in step S635. The parameter adjusting module 410 further stops adjusting the equalization parameter EP and controls the signal processing circuit 110 to perform the equalization according to the equalization parameter EP having the optimal value in step S650. Subsequently, the parameter adjusting module 410 determines whether another equalization parameter EP is needed to be adjusted or the operation flow 600 is to be terminated according to the determination result generated in step S655.

In the usage scenarios described above, the first adjusting direction is selected corresponding to the 1st adjustment. However, the second adjusting direction can also be selected corresponding to the 1st adjustment so as to execute the following steps in the operation flow 600 with the same rationale. The detail is thus not described herein.

It is appreciated that the embodiments described above are merely an example. In other embodiments, it is appreciated that various modifications and changes may be made by those of ordinary skill in the art without departing, from the spirit of the invention.

In summary, the signal receiving apparatus and the signal receiving method having parameter optimization mechanism sample the data signal according to multiple phases and multiple threshold values to generate sampling results so as to perform comparison and statistics accordingly. The analysis result of the data signal can be obtained to adjust the equalization parameter accordingly to make the analysis result of the data signal approximate the optimized parameter requirements.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A signal receiving apparatus having parameter optimization mechanism comprising:
   a signal processing circuit configured to perform equalization on a data signal according to at least one equalization parameter to generate an equalized data signal;
   a clock data recovery circuit configured to perform first clock data recovery on the equalized data signal according to a primary sampling signal and a primary threshold value to generate primary recovered data, wherein the primary sampling signal has a primary sampling phase and the primary threshold value is used to determine a logic level of the equalized data signal;
   a multi-sampling circuit configured to perform second clock data recovery on the equalized data signal according to a plurality of secondary sampling signals and a plurality of secondary threshold values to generate a plurality of pieces of secondary recovered data, wherein each of the plurality of secondary sampling signals has a secondary sampling phase and each of the plurality of secondary threshold values is used to determine the logic level of the equalized data signal; and
   a parameter optimization circuit configured to perform comparison and statistics on the primary recovered data and the plurality pieces of secondary recovered data to generate an analysis result that at least comprises an eye diagram and a bit error rate of the equalized data signal, so as to control the signal processing circuit to adjust the at least one equalization parameter according to the analysis result and a predetermined optimized parameter requirement such that the analysis result approximates the predetermined optimized parameter requirement.

2. The signal receiving apparatus of claim 1, wherein the signal processing circuit comprises a linear equalizer and a decision feedback equalizer circuit, the at least one equalization parameter comprises at least one linear equalization parameter corresponding to the linear equalizer and at least one decision feedback equalization parameter corresponding to the decision feedback equalizer circuit.

3. The signal receiving apparatus of claim 1, wherein the primary sampling phase corresponds to a central time spot of a signal time period corresponding to the equalized data signal, the secondary sampling phases correspond to a plurality of time spots of the signal time period;
   the primary threshold value corresponds to a centermost value between an ideal high level and an ideal low level of the equalized data signal, and the plurality of secondary threshold values correspond to a plurality of other values between the ideal high level and the ideal low level.

4. The signal receiving apparatus of claim 3, wherein the parameter optimization circuit comprises a receiving status determining module configured to generate the analysis result, wherein the receiving status determining module is configured to:
   perform comparison on the primary recovered data and the plurality of secondary recovered data to perform statistics of unmatched times on each of the plurality of secondary recovered data;

determine an eye width of the eye diagram according to the unmatched times related to the secondary sampling phase of the plurality of secondary sampling signals; and determine an eye height of the eye diagram according to the unmatched times related to the plurality of secondary threshold values.

5. The signal receiving apparatus of claim 4, wherein the receiving status determining module is further configured to determine a total jitter amount of a transition edge according to the unmatched times related to the secondary sampling phase of the plurality of secondary sampling signals and a phase position of the secondary sampling phase, so as to determine the bit error rate according to a relation between the total jitter amount and a jitter threshold value.

6. The signal receiving apparatus of claim 3, wherein the parameter optimization circuit comprises a parameter adjusting module configured to:

determine a parameter adjusting direction of the at least one equalization parameter according to the analysis result and the predetermined optimized parameter requirement;

set the at least one equalization parameter after the N-th adjustment as an optimal value when the analysis result after the N-th adjustment is better than the analysis result after the N−1-th adjustment and maintain the parameter adjusting direction to perform the N+1-th adjustment; and set the at least one equalization parameter after the N−1-th adjustment as the optimal value when the analysis result after the N-th adjustment is worse than the analysis result after the N−1-th adjustment and invert the parameter adjusting direction to perform the N+1-th adjustment.

7. The signal receiving apparatus of claim 6, wherein when the analysis result after the N-th adjustment is better than the analysis result after the N−1-th adjustment and the at least one equalization parameter reaches a boundary value, the parameter adjusting module stops adjusting the at least one equalization parameter and control the signal processing circuit to perform equalization according to the at least one equalization parameter having the optimal value.

8. The signal receiving apparatus of claim 6, wherein when the analysis result after the N−1-th adjustment is better than the analysis result after the N−2-th adjustment and when the analysis result after the N-th adjustment is worse than the analysis result after the N−1-th adjustment, the parameter adjusting module stops adjusting the at least one equalization parameter and control the signal processing circuit to perform equalization according to the at least one equalization parameter having the optimal value.

9. The signal receiving apparatus of claim 6, wherein when the analysis result after the 1st adjustment is worse than the analysis result under a condition that no adjustment is performed and when the analysis result after the 2nd adjustment is worse than the analysis result after the 1st adjustment, the parameter adjusting module stops adjusting the at least one equalization parameter and control the signal processing circuit to perform equalization according to the at least one equalization parameter having the optimal value.

10. A signal receiving method having parameter optimization mechanism used in a signal receiving apparatus, comprising:

performing equalization on a data signal according to at least one equalization parameter to generate an equalized data signal by a signal processing circuit;

performing first clock data recovery on the equalized data signal according to a primary sampling signal and a primary threshold value to generate primary recovered data by a clock data recovery circuit, wherein the primary sampling signal has a primary sampling phase and the primary threshold value is used to determine a logic level of the equalized data signal;

performing second clock data recovery on the equalized data signal according to a plurality of secondary sampling signals and a plurality of secondary threshold values to generate a plurality of pieces of secondary recovered data by a multi-sampling circuit, wherein each of the plurality of secondary sampling signals has a secondary sampling phase and each of the plurality of secondary threshold values is used to determine the logic level of the equalized data signal; and performing comparison and statistics on the primary recovered data and the plurality pieces of secondary recovered data to generate an analysis result that at least comprises an eye diagram and a bit error rate of the equalized data signal by a parameter optimization circuit, so as to control the signal processing circuit to adjust the at least one equalization parameter according to the analysis result and a predetermined optimized parameter requirement such that the analysis result approximates the predetermined optimized parameter requirement.

11. The signal receiving method of claim 10, wherein the signal processing circuit comprises a linear equalizer and a decision feedback equalizer circuit, the at least one equalization parameter comprises at least one linear equalization parameter corresponding to the linear equalizer and at least one decision feedback equalization parameter corresponding to the decision feedback equalizer circuit.

12. The signal receiving method of claim 10, wherein the primary sampling phase corresponds to a central time spot of a signal time period corresponding to the equalized data signal, the secondary sampling phases correspond to a plurality of time spots of the signal time period;

the primary threshold value corresponds to a centermost value between an ideal high level and an ideal low level of the equalized data signal, and the plurality of secondary threshold values correspond to a plurality of other values between the ideal high level and the ideal low level.

13. The signal receiving method of claim 12, wherein the parameter optimization circuit comprises a receiving status determining module, the signal receiving method further comprises:

performing comparison on the primary recovered data and the plurality of secondary recovered data to perform statistics of unmatched times on each of the plurality of secondary recovered data by the receiving status determining module;

determining an eye width of the eye diagram according to the unmatched times related to the secondary sampling phase of the plurality of secondary sampling signals by the receiving status determining module; and determining an eye height of the eye diagram according to the unmatched times related to the plurality of secondary threshold values by the receiving status determining module.

14. The signal receiving method of claim 13, further comprising:

determining a total jitter amount of a transition edge according to the unmatched times related to the secondary sampling phase of the plurality of secondary sampling signals and a phase position of the secondary sampling phase by the receiving status determining module, so as to determine the bit error rate according to a relation between the total jitter amount and a jitter threshold value.

15. The signal receiving method of claim 12, wherein the parameter optimization circuit comprises a parameter adjusting module, the signal receiving method further comprises:
determining a parameter adjusting direction of the at least one equalization parameter according to the analysis result and the predetermined optimized parameter requirement by the parameter adjusting module;
setting the at least one equalization parameter after the N-th adjustment as an optimal value by the parameter adjusting module when the analysis result after the N-th adjustment is better than the analysis result after the N−1-th adjustment and maintain the parameter adjusting direction to perform the N+1-th adjustment; and
setting the at least one equalization parameter after the N−1-th adjustment as the optimal value by the parameter adjusting module when the analysis result after the N-th adjustment is worse than the analysis result after the N−1-th adjustment and invert the parameter adjusting direction to perform the N+1-th adjustment.

16. The signal receiving method of claim 15, further comprising:
when the analysis result after the N-th adjustment is better than the analysis result after the N−1-th adjustment and the at least one equalization parameter reaches a boundary value, stopping adjusting the at least one equalization parameter and controlling the signal processing circuit to perform equalization according to the at least one equalization parameter having the optimal value by the parameter adjusting module.

17. The signal receiving method of claim 15, further comprising:
when the analysis result after the N−1-th adjustment is better than the analysis result after the N−2-th adjustment and when the analysis result after the N-th adjustment is worse than the analysis result after the N−1-th adjustment, stopping adjusting the at least one equalization parameter and controlling the signal processing circuit to perform equalization according to the at least one equalization parameter having the optimal value by the parameter adjusting module.

18. The signal receiving method of claim 15, further comprising:
when the analysis result after the 1st adjustment is worse than the analysis result under a condition that no adjustment is performed and when the analysis result after the 2nd adjustment is worse than the analysis result after the 1st adjustment, stopping adjusting the at least one equalization parameter and controlling the signal processing circuit to perform equalization according to the at least one equalization parameter having the optimal value by the parameter adjusting module.

* * * * *